United States Patent
Kikuchi et al.

[15] 3,703,100
[45] Nov. 21, 1972

[54] INSPECTING SYSTEM WITH A BRANCH CHUTE FOR SAMPLING FINISHED WORKPIECES

[72] Inventors: Makoto Kikuchi, Kariya; Isao Suzuki, Okazaki, both of Japan

[73] Assignee: Toyoda Koki Kabushiki Kaisha, Kariya-shi, Aichi-ken, Japan

[22] Filed: Aug. 13, 1971

[21] Appl. No.: 171,613

[30] Foreign Application Priority Data
Aug. 25, 1970 Japan ............... 45/74036

[52] U.S. Cl. ............... 73/423, 193/31 R
[51] Int. Cl. ............... G01n 1/02
[58] Field of Search ......... 73/421 R, 423 R; 193/31 R

[56] References Cited
UNITED STATES PATENTS 2,068,344 1/1937 McManus ............... 73/421 R
2,311,732 2/1943 Buchholz ............... 193/31 R

*Primary Examiner*—S. Clement Swisher
*Attorney*—Norman F. Oblon et al.

[57] ABSTRACT

In a post-process control system of gauging, a finished workpiece is led by a shutter from a delivery chute to an inspecting station placed in a branch chute each time a predetermined number of workpieces have been machined. At the inspecting station, the finished workpiece is clamped by a clamping device and in turn is measured by a sizing device for generating a compensating signal to adjust a signal unit of the in-process control system of gauging.

7 Claims, 6 Drawing Figures

3,703,100

INSPECTING SYSTEM WITH A BRANCH CHUTE FOR SAMPLING FINISHED WORKPIECES

BACKGROUND OF THE INVENTION

The present invention relates generally to post-process control gauging, and more particularly to an inspecting device for leading a finished workpiece from a delivery chute to a branch chute inspecting station in which the finished workpiece is clamped and measured by a sizing device.

Machining operations for quantity production are generally controlled by a time-based or fixed-stop machining cycle, or an in-process control gauging. Such conventional methods are likely to introduce errors in the finished part size as a result of either tool wear or thermal deflection in the workpiece.

Particularly in a grinding operation of bearing races, which are ground by a centerless grinding machine of the type characterized by a bearing race being rotatably supported by shoes, measuring errors are likely to occur in the finished race size because the high speed rotation rendered to the bearing race causes wear of the shoes and the measuring feelers of the sizing device being employed and also because the required accuracy in size of such parts is extremely high. Besides, should such errors occur, inferior races are then produced in very large quantity, because of the very short period of time that it takes to produce each race, being on the order, for example, of about 5 seconds. Therefore, it is difficult to reduce the number of machine operators, since it is necessary in such grinding operations to frequently inspect the accuracy of the finished workpieces.

SUMMARY OF THE INVENTION

It is, therefore, an object of the present invention to provide an apparatus for automatically inspecting the finished size of a workpiece being positioned at an inspecting station branching off from the normal delivery chute.

It is another object of the present invention to provide an inspecting system having a branch chute for leading a finished workpiece to an inspecting station wherein the finished workpiece is clamped to be accurately measured.

It is still another object of the present invention to provide an inspecting system for sampling finished workpieces at predetermined intervals of numbers of such finished workpieces from a delivery chute to obtain an adequate measurement of the accuracy of the sizes of the workpieces.

Briefly, according to the present invention, these and other objects are achieved by providing an inspecting system which comprises a first sizing device for measuring the diameter of a workpiece to be ground at a grinding station, a first signal unit for generating a sizing signal, a second sizing device for measuring the finished size of the workpiece subsequent to grinding being positioned at an inspecting station on a branch chute of a delivery chute, and a second signal unit for generating a compensating signal corresponding to a differential between the desired finished workpiece size and the size measured by said second sizing device to adjust the first signal unit so that the sizing signal of the first signal unit may be generated when a workpiece is ground to the desired size. Furthermore, the delivery chute is mounted on a stationary frame being inclined upwardly in the direction of the grinding station to transfer the finished workpieces by rolling. The branch chute also is fixedly mounted on the stationary frame and has the inspecting station thereon in which the finished workpiece is clamped by a clamping device, in turn being measured by the second sizing device. A shutter is movably mounted between the delivery and the branch chutes to selectively lead one of the finished workpieces from the delivery chute to the branch chute. The shutter is normally urged by a spring in a direction to disconnect the delivery and the branch chutes and an actuator is provided for moving the shutter in the other direction to connect the branch chute to the delivery chute at intervals of a predetermined number of finished workpieces. A control device counts the number of finished workpieces being delivered on the delivery chute and controls a series of inspecting operations, such as the branching operation of the shutter, the clamping and the sizing operations.

BRIEF DESCRIPTION OF THE DRAWINGS

The foregoing and other objects, features and attendant advantages of the present invention will be more fully appreciated as the same becomes better understood from the following detailed description of a preferred embodiment when considered in connection with the accompanying drawings, in which like reference numerals designate like or corresponding parts throughout the several views, and wherein.

DESCRIPTION OF A PREFERRED EMBODIMENT

Figure 1:
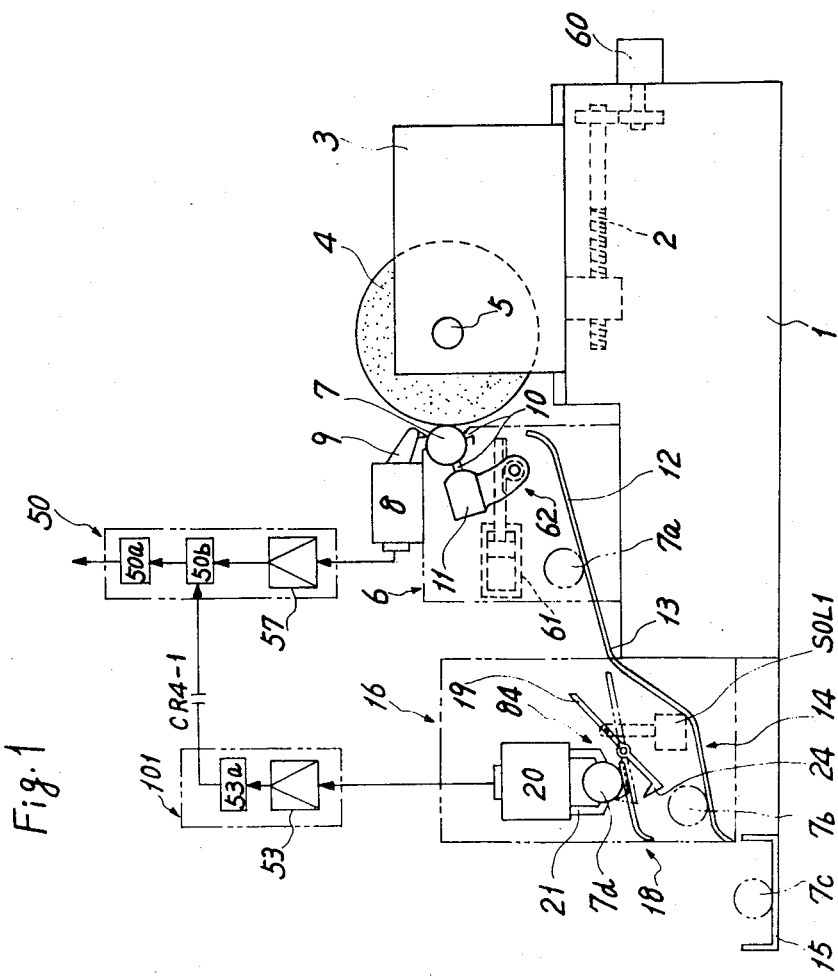
FIG. 1 is a schematic view showing a preferred embodiment according to the present invention.

Referring now to the drawings, and more particularly to FIG. 1, a bed 1 slidably mounts a wheel slide 3 on which a grinding wheel 4 is rotatably supported by a wheel shaft 5. The wheel slide 3 is threadedly engaged with a feed screw 2 being rotatable by an actuator 60 for moving the wheel slide toward and away from a workpiece 7. The workpiece 7 is rotatably supported by a pair of shoes 10 and is rotated by a magnetic driver, not shown, during a grinding operation in a manner well known to those skilled in the art. Thus, the workpiece 7 is ground by the rotating grinding wheel 4 at a grinding station formed by the work-supporting shoes 10 and the related structure. The workpiece 7 is also held in measuring engagement with a measuring feeler 9 of an in-process gauging device or a first sizing device 8, which produces an output signal in accordance with the size of the workpiece 7 being ground, usually through the agency of a differential transformer, not shown, operated by the measuring feeler 9. Further description of the first sizing device 8 will not be given since such sizing devices are well known to those skilled in the art.

The rear shoe 10 is secured to a shoe holder 11 which is moved toward and away from the workpiece 7 by a hydraulic actuator 61 and a rack and pinion mechanism 62 contained in a work-handling mechanism 6. A delivery chute 12 is fixedly mounted and inclined upwardly in the direction of the grinding station so that finished or ground workpieces may roll downwardly thereon away from the grinding station through positions indicated by the numerals 7a and 7b and into a position indicated by the numeral 7c on a work-transfering conveyor 15.

An inspecting device 16 formed according to the present invention will now be described in detail. In the lower portion of the delivery chute 12, an unloading chute generally indicated by the numeral 14, is provided having a branch chute 18, a diverging device in the form of a shutter 19 and a controlling solenoid SOL 1, a clamping device 63 and a post-process gauging device, or a second sizing device, 20, as shown in FIGS. 3 and 4.

Figure 2:
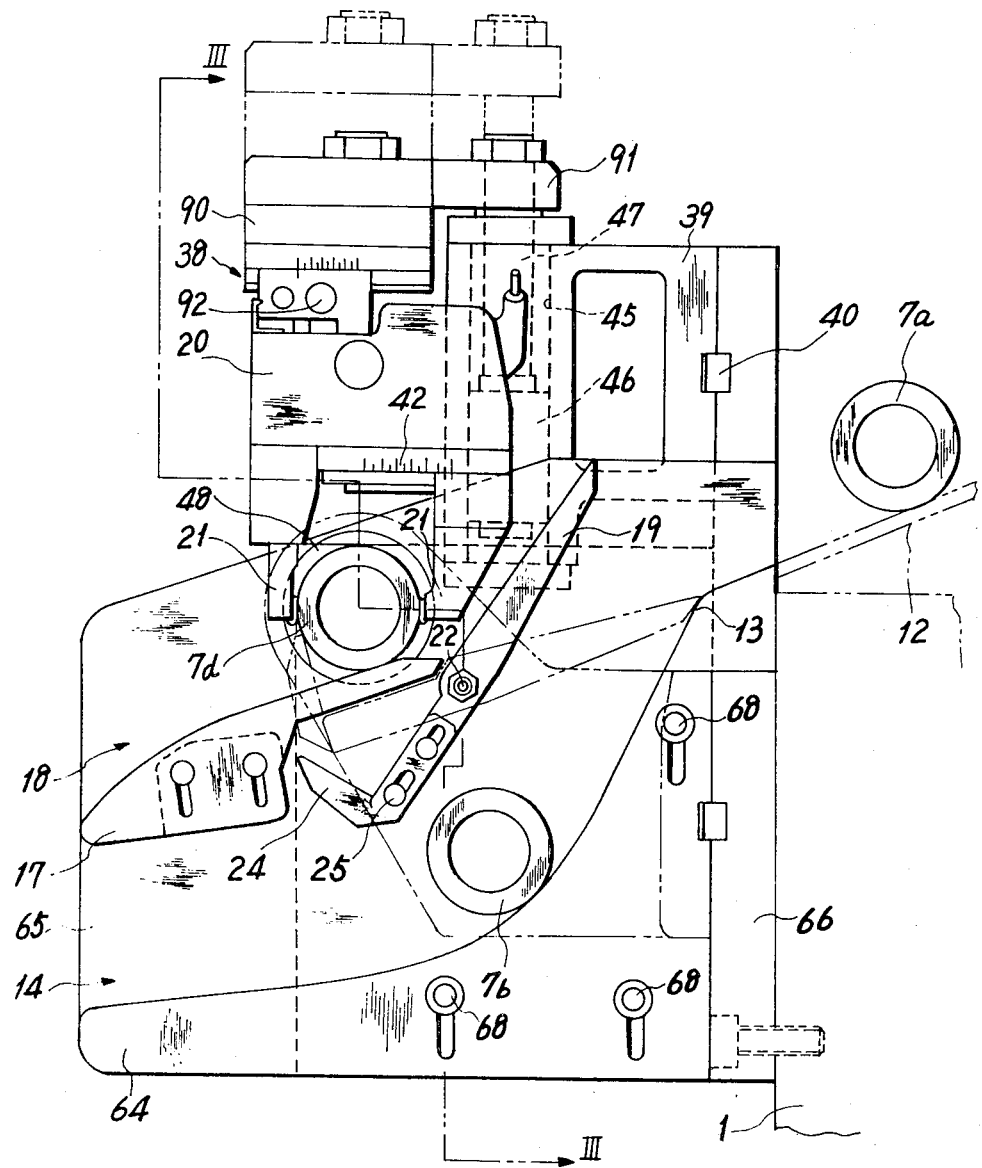
FIG. 2 is a front view showing an inspecting device.
Figure 3:
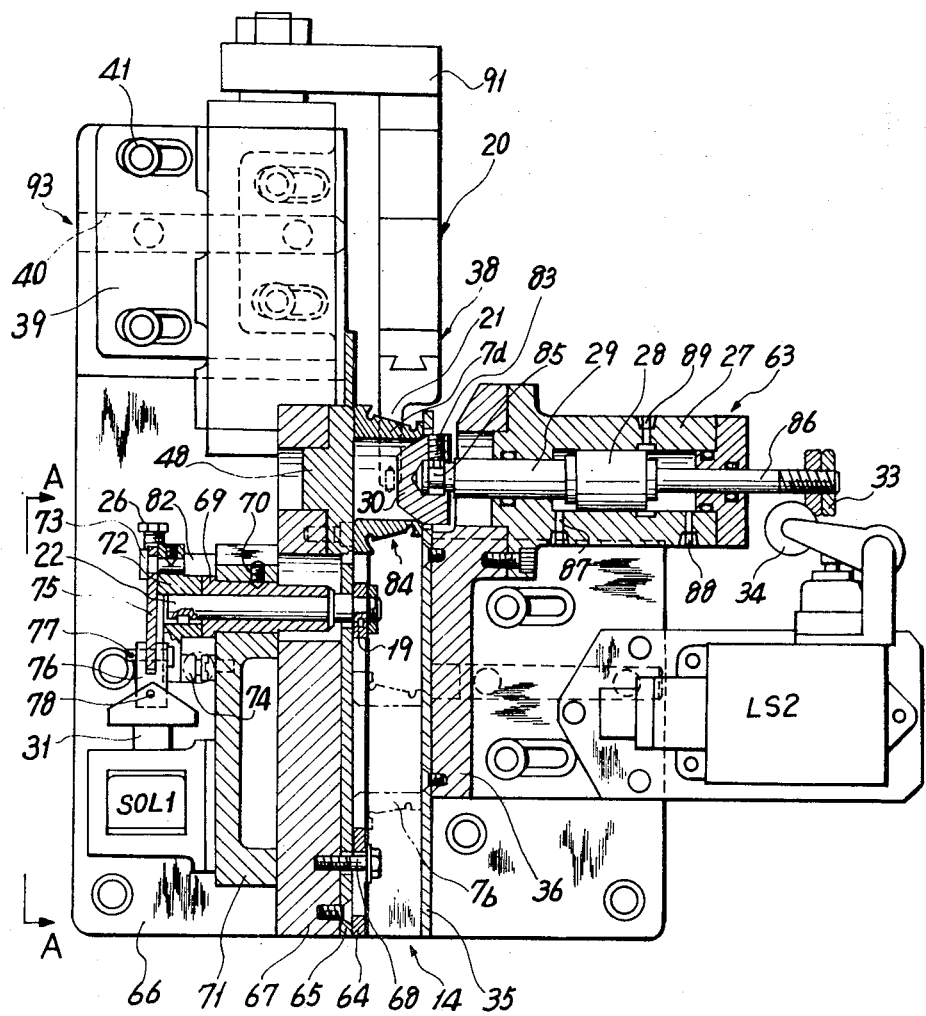
FIG. 3 is a sectional view taken along the line III—III of FIG. 2.
Figure 4:
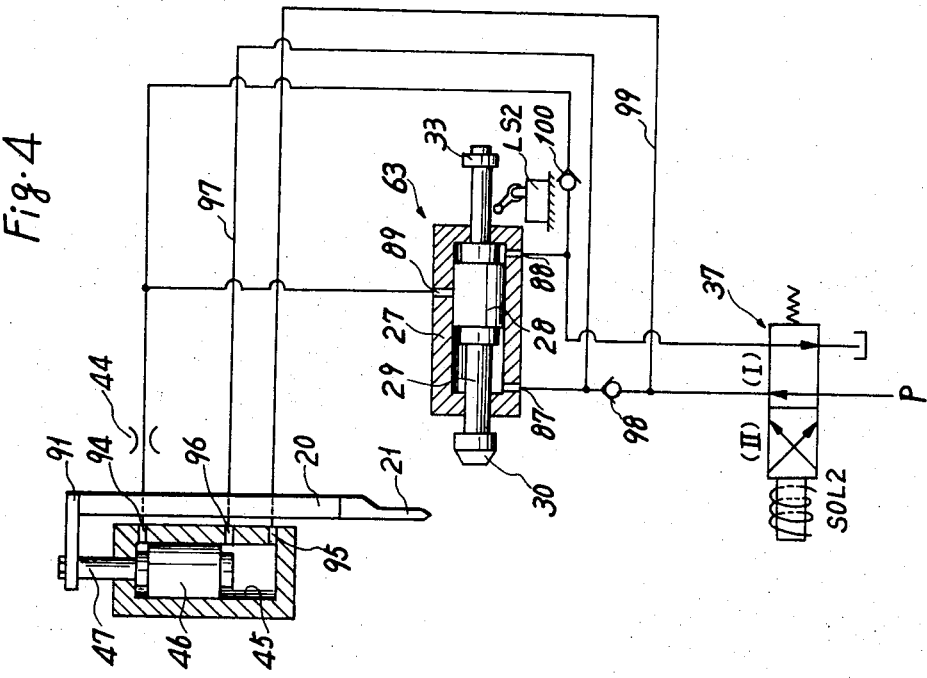
FIG. 4 is a hydraulic control circuit for moving sizing and clamping devices.

In FIGS. 2 and 3, the unloading chute 14 constitutes a guide plate 64 and a pair of slide plates 35 and 65. The side plate 65 is fixedly mounted on a projecting portion 67 of a T-shaped bracket 66 fixed on the left side of bed 1. The guide plate 64 is adjustably secured to the projecting portion 67 by bolts 68. The side plate 35 is secured in parallel relation with the side plate 65 to an L-shaped bracket 36, which is adjustably fixed to the T-shaped bracket 66 so that the distance between the side plates 35 and 65 may be a little larger than the width of the workpiece. The unloading chute 14 is connected to the lower end of delivery chute 12 at its upper end. At a diverging position 13, the upper edge of the guide plate 64 is sharply curved toward the work-transferring conveyor 15 located below the diverging position 13, as shown in FIGS. 1 and 2.

The branch chute 18 is constituted by a guide plate 17 and the side plates 35 and 65 common to the unloading chute 14. Above the left portion of the unloading chute 14, the guide plate 17 is adjustably mounted on the projecting portion 67 through the side plate 65 so that an upper edge of the guide plate may be nearly on an extension of the delivery chute 12.

Figure 3A:
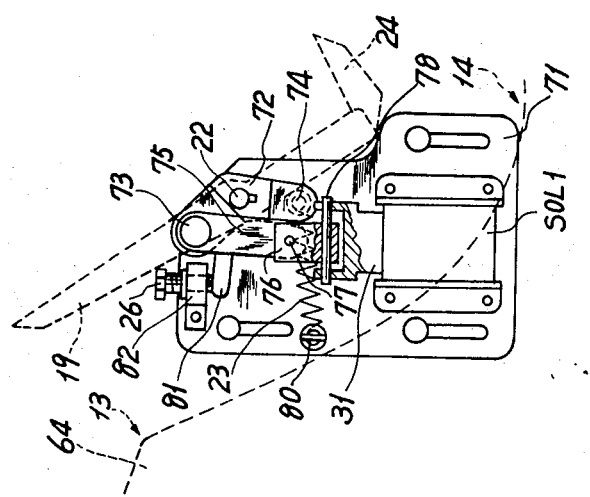
FIG. 3A is a fragmentary sectional side view taken along the line A—A of FIG. 3.

The shutter 19 is keyed to a shaft 22 which is positioned adjacent the right end of guide plate 17 and is rotatably mounted on a bushing 69, as shown in FIG. 3, so that the right end of shutter 19 may be moved toward and away from the diverging position 13, as seen in real and imaginary lines in FIG. 2. The bushing 69 is fixed by a set screw 70 to a bracket 71 which is adjustably secured to the left side of projecting portion 67. To the left end of shaft 22 is keyed a swinging member 72 which fixedly mounts a pin 73 and a screw 74. A link 75 is rotatably mounted on the one end of swinging member 72 by the pin 73. A connecting piece 76 universally connects the link 75 to an armature 31 of solenoid SOL 1 by intersecting pins 77 and 78. A spring 23 is connected at one end thereof to screw 74 threaded to the other end of swinging member 72 and is connected to a screw 80 threaded to the bracket 71 at its other end so as to normally urge the shaft 22 in the clockwise direction, as shown in FIG. 3A. Therefore, the end of shutter 19 is moved upwardly when the solenoid SOL 1 is de-energized, the upper position to which the shutter 19 may be moved being set by an abutting engagement of a stop bolt 26 with a projection 81 fixed to the link 75. The stop bolt 26 is threadedly engaged with an L-shaped bracket 82 secured to the bracket 71. A detent 24 is adjustably secured to the end portion of the shutter 19 opposite the workpiece receiving end for stopping a ground workpiece which is introduced into the branch chute 18 when the shutter 19 is moved toward the diverging position 13 by the energization of solenoid SOL 1, as shown by phantom line in FIG. 2.

The clamping device 63 is described hereinbelow with reference particularly being made to FIG. 3, wherein the L-shaped bracket 36 is shown having mounted thereon a cylinder 27 in which a piston 28 is slidably received. A clamping head 30 is connected to the piston 28 through a piston rod 29 to clamp the ground workpiece 7d stopped by the detent 24 at an inspecting station generally indicated by the numeral 84. A positioning plate 48 is mounted on the projecting portion 67 opposite the clamping head 30. An engaging screw 83 is radially threaded to the clamping head 30 and is loosely engaged with a peripheral groove 85 formed on the left end of piston rod 29 so that the clamping head 30 may be slightly movable to fit the bore of the ground workpiece 7d. A conical surface is formed on the left side of clamping head 30 to facilitate radially positioning the ground workpiece 7d at the inspecting station 84 and also to clamp other workpieces having various sizes of bores.

A dog 33 is threadedly fixed to a rear piston rod 86 so as to operate a limit switch LS 2 by engagement with a roller 34 associated therewith when the clamping head 30 clamps the ground workpiece 7d at the inspecting station 84. The limit switch LS 2 is fixed to the L-shaped bracket 36. A port 88 is formed on the rear of cylinder 27 to introduce fluid under pressure therein so that the piston 28 may be leftwardly, or forwardly, moved. An intermediate port 89 is formed on the middle portion of cylinder 27 so as to be connected to the rear port 88 when the piston 28 reaches to its leftmost limit, and front port 87 is formed on the front portion of cylinder 27 to introduce fluid under pressure therein so that the piston may be rightwardly, or rearwardly, moved.

A post-process gauging device, or a second sizing device, 20 is adjustably secured by a bolt 92, FIG. 2, to a base member 90 which is connected to a piston rod 47 through a supporting member 91. A piston 46 having a piston rod 47 is slidably received in a cylinder 45 formed on a cylinder bracket 39 adjustably secured to the upper portion of the T-shaped bracket 66 by a key 40 and bolts 41. The position of the second sizing device 20 is adapted to be axially and radially adjusted with respect to the ground workpiece 7d by use of key and dovetail engagements 93 and 38, respectively, so that a pair of measuring feelers 21 mounted thereon may be suitably positioned to measure the diameter of the ground workpiece 7d when they are moved by the piston 46 to the inspecting station 84. An upper port 94 is formed in the upper portion of cylinder 45, as shown in FIG. 4, to introduce fluid under pressure so that the piston 46 may be downwardly moved. A lower port 95 is formed in the lower portion of cylinder 45 to introduce fluid under pressure for moving the piston 46 upwardly and an intermediate port 96 is formed in the middle portion of the cylinder 45 so as to be connected to the lower port 95 when the piston 46 reaches its upper limit.

A hydraulic diagram for operating the second sizing device 20 and the clamping device 63 is further described hereinbelow with reference particularly being made to FIG. 4. The front port 87 of the cylinder 27 is connected to a magnetic change-over valve 37 through a check valve 98, which permits fluid only to pass therethrough in the direction of the changeover valve 37 and the intermediate port 96 of the cylinder 45 is connected to the conduit between port 87 and check valve 98 by a conduit 97. The lower port 95 of the second sizing device-controlling cylinder 45 is connected to the conduit between check valve 98 and the change-over valve 37 by a conduit 99 and the upper port 94 thereof is connected to the change-over valve 37 through a throttle valve 44 and a check valve 100, which permits fluid to pass therethrough only into the change-over valve 37. The rear port 88 of the clamping device-controlling cylinder 27 is connected to the conduit between the check valve 100 and the change-over valve 37 and the intermediate port 89 thereof is connected to the conduit between the throttle valve 44 and the check valve 100. The magnetic change-over valve 37 has two positions I and II and is adapted to be changed to the position II only when a solenoid SOL 2 is energized.

The second sizing device 20 measures the diameter of the ground workpiece 7d clamped in the inspecting station 84 and generates an output signal corresponding to the finished size of the ground workpiece 7d through a differential transformer, not shown, contained therein, in a manner well known to those skilled in the art. The output signal is applied to a comparator 53a through a conventional amplifier 53, shown in FIG. 1. The comparator 53a compares the measured value of the output signal with a preselected value corresponding to a desired finished size to produce a differential or a compensating signal corresponding to the differential value therebetween. A second signal unit 101 including the comparator 53a and the amplifier 53 is well known to those skilled in the art and is manufactured by Tokyo Seimitsu Ltd., of Tokyo, Japan, being commercially available as PULCOM MODEL E-PC20R-4PS. The output signal transmitted from the first sizing device 8 is applied to a sizing signal-generating circuit or a well known Schmidt triggering circuit 50a through a zero point-adjusting circuit 50b and an amplifier 57. The Schmidt circuit 50a generates sizing signals when the value of the output signal reaches preselected values corresponding to desired workpiece sizes. The sizing signals control the operation of wheel slide 3 and work-handling mechanism 6 by means of another controller, not shown, and the actuator 60. The compensating signal is applied to the zero point-generating circuit 50b which compensates the output signal from the first sizing signal by the value corresponding thereto. Further description of a first signal unit 50 including the components 50a, 50b, and 57 will not be given since such a signal unit is well known and is manufactured by Tokyo Seimitsu Ltd., being commercially available as PULCOM MODEL E-MD-PC-3P-10ZS.

Figure 5:
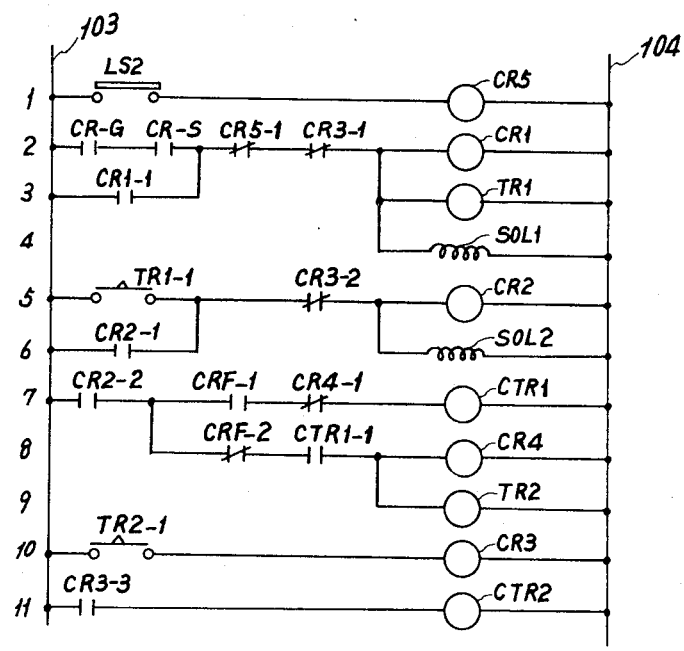
FIG. 5 is an electric control circuit of the present invention.

An electric circuit for the mechanism of the present invention is shown in FIG. 5. Relays, solenoids, switches, and contacts are disposed in lines 1 to 11 inclusive between an energized vertical line 103 and a ground vertical line 104. The limit switch LS 2 and a relay CR 5 are connected in line 1. Contacts CR-G and CR-S, normally closed contacts CR5-1 and CR3-1, and a relay CR 1 are connected in line 2. Contact CR-G is closed by command of an automatic grinding cycle and contact CR-S is closed by the sizing signal from Schmidt circuit 50a. Relay CR 1 serves to start the operation of the inspecting device 16. A self-holding contact CR1-1 in line 3 is connected in parallel with contacts CR-G and CR-S and is closed by the energization of relay CR 1. A timer relay TR 1, line 3, and solenoid SOL 1, line 4, are respectively connected in parallel with relay CR 1. The timer relay TR 1 confirms a work-loading operation in which an unground workpiece is loaded at the grinding station. A timer contact TR 1-1 closed by the energization of timer relay TR 1, a normal closed contact CR3-2, and a relay CR 2 are connected in line 5. A self-holding contact CR2-1 is connected in parallel with timer contact TR1-1 in line 6 to hold the energization of solenoid SOL 2 which is connected in parallel with relay CR 2. When solenoid SOL 2 is energized, the clamping head 30 is moved toward the sampled workpiece 7d stopped by the detent 24 at the inspecting station 84, the second sizing device 20 in turn being moved to the workpiece 7d, as described hereinafter. Contacts CR2-2 and CRF-1, a normally closed contact CR4-1, and a counter relay CTR1 are connected in line 7. A normal closed contact CRF-2, a contact CTR1-1, and a relay CR 4 are connected in line 8 in parallel with contacts CRF-1 and CR4-1 and counter relay CTR 1. Counter relay CTR 1 serves to close contact CTR1-1 only when the number of ground workpieces reaches a predetermined number. A timer TR 2 in line 9 is connected in parallel with relay CR 4. A contact TR2-1 and a relay CR 3 are connected in line 10. When relay CR 3 is energized, normally closed contacts CR3-1, line 2, and CR3-2, line 5, are opened and a contact CR3-3, line 11, is closed to energize a relay CTR 2 connected thereto in series, thereby to reset the counter relay CTR 1.

The operation of the preferred embodiment of the present invention is described hereinbelow. When a workpiece 7 has been ground to the predetermined size, the sizing signal is transmitted from the Schmidt circuit 50a to cause rearward movement of the wheel slide 3 and to move the shoe holder 11 away from the front shoe 10, whereby the ground workpiece is discharged downwardly into the delivery chute 12. Then, since contact CR-S is closed by the sizing signal and contact CR-G has been closed by the command of the automatic grinding cycle, relay CR 1, timer relay TR 1, and solenoid SOL 1 are energized by the electric connection of the closed contacts CR-G and CR-S and normally closed contacts CR5-1 and CR3-1, and are held by the self-holding contact CR1-1. The shutter 19 is moved downwardly to the diverging position 13 by the energization of solenoid SOL 1, so that the discharged workpiece rolls toward the inspecting station 84 on the branch chute 18 through the diverging position 13, the shutter 19 forming the front portion of the branch chute 18 and the detent 24 opposite thereto stopping the ground workpiece 7d at the inspecting station 84. The timer relay TR 1 is previously rendered an adequate interval of time so as to close the timer contact TR1-1 after the ground workpiece 7d is fully stopped at the inspecting station 84. Solenoid SOL 2 is energized by the close of timer contact TR1-1 and is held by the self-holding contact CR2-1. Thus, the magnetic change-over valve 37, FIG. 4, is shifted to the right into position II to introduce fluid under pressure to the right chamber of cylinder 27 through the rear port 88, to move the piston 28 leftwardly. This causes the ground workpiece 7d to be precisely clamped and positioned by the clamping head 30 at the inspecting station 84. Fluid under pressure introduced into the cylinder 27 is, in turn, applied to the upper chamber of cylinder 45 through the intermediate port 89 of cylinder 27 and the throttle valve 44, thus moving the second sizing device 20 downwardly to the clamped workpiece 7d to measure the finished size of the workpiece 7d. The second sizing device 20 generates an output signal in accordance with the actual finished size of the ground workpiece 7d through the displacement of the measuring feelers 21 when brought into contacting engagement with the workpiece 7d and this output signal is then compared with the preselected value corresponding to the desired finished size of the workpiece in the comparator 53a, which generates a compensating signal corresponding to the differential value existing therebetween. The compensating signal is applied to the zero point-adjusting circuit 50b when contact CR4-1 is closed.

When the clamping head 30 reaches the left limit of its movement, limit switch LS 2 is actuated by the dog 33 to close its contact LS 2 in the electrical control circuit, thus energizing relay CR 5 to open the normally closed contact CR5-1. Since solenoid SOL 1 is held in a de-energization throughout the clamping of the ground workpiece 7d by the clamping head 30, the shutter 19 is moved upwardly by the spring 23 until the projection 81 engages the screw 26, as shown in FIG. 3A. Thereafter, discharged workpieces roll onto the work-transfering conveyor 15 through the positions designated by numerals 7a, 13, and 7b.

Contact CRF-1 is closed each time the wheel slide 3 is moved toward the grinding station. Counter relay CTR 1 closes and holds contact CTR1-1 when energized by the closing of the contact CRF-1 a predetermined number of times. Relay CR 4 and timer TR 2 are energized by the closing of contact CTR1-1 to close contact CR4-1, shown in FIG. 1. Then, the compensating signal is applied to the zero point-adjusting circuit 50b to automatically adjust the output signal from the first sizing device 8 so that a sizing signal may be generated by the Schmidt circuit 50a when the workpiece 7 has been ground to the desired size.

When the timer TR 2 is energized over a preset interval of time sufficient to adjust the output signal, contact TR2-1 is closed to thereby energize relay CR 3, thus opening normally closed contact CR3-2. Therefore, relay CR 2 is de-energized thereby to open self-holding contacts CR2-1 and CR2-2 and in turn to de-energize the solenoid SOL 2. Then, the magnetic change-over valve 37 in FIG. 4 is leftwardly moved by a spring associated therewith to its position I to introduce fluid under pressure from a fluid pressure source, not shown, to the lower chamber of cylinder 45 through conduit 99 and lower port 95 thereby to move the piston 46 upwardly. The measuring feelers 21 are thus moved to the retracted position so as not to strike on the succeeding finished workpiece being led to the inspecting station 84. Fluid under pressure introduced into the cylinder 45 is, in turn, applied to the front chamber of cylinder 27 through intermediate port 96 of the cylinder 45 and conduit 97, thus moving the clamping head 30 rightwardly. Thus, the inspected workpiece 7d is released and rolls on from the branch chute 18 into the work-transferring conveyor 15.

Contact CR3-3 is closed by the energization of relay CR 3 thereby to energize relay CTR 2, which operates to reset counter relay CTR 1, thus de-energizing relay CR 4 and timer TR 2 through the opening of contact CTR1-1.

Although certain specific embodiments of the invention have been shown and described, it is obvious that many modifications and variations thereof are possible in light of the above teachings. It is to be understood, therefore, that within the scope of the appended claims, the invention may be practiced otherwise than as specifically described herein.

What is claimed as new and desired to be secured by Letters Patent of the United States is:

1. In an inspecting system for a centerless grinding machine of the type wherein a workpiece is rotatably supported on shoes, having a first sizing device for measuring the diameter of a workpiece being ground at a grinding station, a first signal unit for generating a sizing signal, a second sizing device for measuring the finished size of the ground workpiece at an inspecting station, and a second signal unit for generating a compensating signal to adjust the first signal unit so that the sizing signal may be generated when a workpiece is ground to a desired size, the improvement comprising:
   a stationary frame;
   a delivery chute mounted on said stationary frame and inclined upwardly in the direction of said grinding station;
   a branch chute mounted on said stationary frame and having said inspecting station thereon;
   diverging means movably mounted between said delivery and said branch chutes to selectively lead a finished workpiece to said inspecting station;
   clamping means mounted opposite said inspecting station for clamping said finished workpiece; and
   means for operating said diverging means at intervals of a predetermined number of finished workpieces,
   whereby said finished workpieces being sampled out of said delivery chute are inspected and measured by said second sizing device to thereby adjust said first signal unit.

2. An inspecting system according to claim 1, wherein said delivery chute has an unloading chute at a lower portion thereof comprising a pair of spaced parallel side plates and a lower guide plate fixedly mounted below said branch chute and between said side plates.

3. An inspecting system according to claim 2, wherein said branch chute comprises an upper guide plate fixedly mounted between said side plates.

4. An inspecting system according to claim 1, wherein said diverging means comprises:

a shaft rotatably mounted adjacent said branch chute in driving engagement with said operating means, and a member secured to said shaft having a guide portion at one end for connecting said branch chute with said delivery chute and a detent at the other end thereof for stopping a finished workpiece at said inspecting station.

5. An inspecting system according to claim 4, wherein said operating means comprises:

an actuator for rotating said shaft in one direction to move said member toward said delivery chute;

resilient means for normally urging said member in the other direction; and control means to count the number of finished workpieces for operating said actuator each time a predetermined number of workpieces have been ground.

6. An inspecting system according to claim 1, wherein said clamping means comprises:

a first cylinder mounted on said stationary frame; and a piston slidably received in said first cylinder having a piston rod, an engaging head loosely mounted on said piston rod, and a positioning plate mounted on said stationary frame opposite said engaging head, whereby a finished workpiece is fixedly positioned at said inspecting station when said engaging head is moved toward said positioning plate.

7. An inspecting system according to claim 6, further comprising:

a second cylinder mounted on said stationary frame;

a piston slidably received in said second cylinder and connected to said second sizing device; and hydraulic control means for connecting said first cylinder with said second cylinder to move said second sizing device toward said finished workpiece after said engaging head has been moved toward said positioning plate and to move said engaging head away from said positioning plate after said second sizing device has been moved away from said finished workpiece.

* * * * *